(12) United States Patent  
Park et al.

(10) Patent No.: US 9,354,504 B1
(45) Date of Patent: May 31, 2016

(54) SYSTEM FOR CONTROLLING CAMERA RIG FOR CAPTURING STEREOGRAPHIC IMAGE

(71) Applicant: REDROVER CO., LTD., Seongnam-si, Gyeonggi-do (KR)

(72) Inventors: Jung Il Park, Seongnam-si (KR); Young Hun Kim, Yongin-si (KR); Dong Soo Kim, Gwangju-si (KR); Jun Woo Seoung, Seongnam-si (KR)

(73) Assignee: REDROVER CO., LTD., Seongnam-Si (KR)

( * ) Notice: Subject to any disclaimer, the term of this patent is extended or adjusted under 35 U.S.C. 154(b) by 0 days.

(21) Appl. No.: 14/754,302

(22) Filed: Jun. 29, 2015

(51) Int. Cl.
*G03B 35/00* (2006.01)

(52) U.S. Cl.
CPC .................................... *G03B 35/00* (2013.01)

(58) Field of Classification Search
CPC .......... G03B 35/00; G03B 35/08; H03K 23/00
See application file for complete search history.

(56) References Cited

U.S. PATENT DOCUMENTS

| 5,036,348 A * | 7/1991 | Kusaka ................ G02B 7/28 396/82 |
| 2003/0095158 A1* | 5/2003 | Akitaya ............... B41J 19/145 347/14 |
| 2006/0023007 A1* | 2/2006 | Muroi ................. B41J 19/202 347/5 |

* cited by examiner

*Primary Examiner* — W B Perkey
(74) *Attorney, Agent, or Firm* — Roberts Mlotkowski Safran & Cole, P.C.

(57) ABSTRACT

A system for controlling a camera rig to capture a stereographic image having a single signal generator which integrally processes encoder signals created from a plurality of motors, in which a single signal counter processes signals generated from the integrated signal generator, without the need for signal counters provided in the respective motors.

4 Claims, 3 Drawing Sheets

SYSTEM FOR CONTROLLING CAMERA RIG FOR CAPTURING STEREOGRAPHIC IMAGE

BACKGROUND OF THE INVENTION

1. Field of the Invention

The present invention relates generally to systems for controlling camera rigs. More particularly, the present invention relates to a system for controlling a camera rig that controls, using motors, the positions and orientations of a left-eye camera and a right-eye camera to capture a stereographic image. The system can more inexpensively process signals generated from the motors.

2. Description of the Related Art

Generally, a left-eye image and a right-eye image must be captured in order to obtain a stereographic image. Furthermore, the positions and orientations of the left- and right-eye images must be adjustable so that the distance therebetween, the angle relative to each other, etc. can be adjusted. To achieve the above-mentioned purposes, there is the need for an apparatus on which a left-eye camera for capturing a left-eye image and a right-eye camera for capturing a right-eye image are movably installed. This apparatus is typically called a stereographic camera rig.

FIG. 1 is a view showing a conventional stereographic camera rig. Referring to FIG. 1, a left-eye camera 20 and a right-eye camera 30 are installed in a stereographic camera rig 10 provided with a half mirror 40. The cameras 20 and 30 capture images of a target that pass through or are reflected by the half mirror 60.

The positions and orientations, i.e. roll and pitch, of the cameras are adjusted so as to precisely align a left-eye image and a right-eye image with each other. For this, the conventional stereographic camera rig may use a goniometer (dovetail module) or a plurality of motors to rotate (i.e. adjust the pitch of) each camera around a y-axis.

FIG. 2 is a block diagram showing the configuration of a conventional camera control apparatus using motors.

Referring to FIG. 2, to adjust the roll and pitch of cameras using motors, there is the need for circuits such as encoders 22, signal generators 23, and signal counters 24. The encoders 22 output encoder signals corresponding to the RPMs of the respective motors 21 in order to control the motors 21. Each signal generator 23 creates and outputs a rotation sensing pulse at the rising edge or the falling edge of an encoder signal generated from the corresponding encoder. Each signal counter 24 counts the number of rotation sensing pulses created from the corresponding signal generator 23 and creates a count value.

In the conventional camera control apparatus having the above-mentioned configuration, each motor 21 includes the circuits such as the encoder 22, the signal generator 23, and the signal counter 24. In addition, each of the encoder 22, the signal generator 23, and the signal counter 24 is embodied by a separate semiconductor chip.

Therefore, to embody the conventional camera control apparatus, required are a comparatively large number of elements including the several motors, along with an encoder chip, a signal generator chip, and a signal counter chip, which are required for each motor. Thus, the overall volume of the apparatus must be comparatively large in order to dispose therein all of the above-mentioned elements. Consequently, there are problems in that the camera control apparatus is large and heavy, and the production cost is also increased.

SUMMARY OF THE INVENTION

Accordingly, the present invention has been made keeping in mind the above problems occurring in the prior art, and an object of the present invention is to provide a system for controlling a camera rig that is configured such that a single signal generator integrally processes encoder signals created from a plurality of motors, unlike the conventional technique, in which circuit elements such as signal generators and signal counters are installed in respective motors in the form of separate chips, and a single signal counter can process signals generated from the integrated signal generators without the need for signal counters provided in the respective motors, whereby the structure of the system can be simple, and the production cost thereof can be reduced.

In order to accomplish the above object, the present invention provides a system for controlling a camera rig for capturing a stereographic image, including: a camera rig body on which a left-eye camera for capturing a left-eye image and a right-eye camera for capturing a right-eye image are installed; a left-eye stage connecting the left-eye camera to the camera rig body, the left-eye stage being configured to adjust a position and an image-capturing direction of the left-eye camera; a right-eye stage connecting the right-eye camera to the camera rig body, the right-eye stage being configured to adjust a position and an image-capturing direction of the right-eye camera; and a motor control device creating control signals corresponding to variation in the positions and the image-capturing directions of the left- and right-eye cameras and transmitting the control signals to the left- and right-eye stages to control movement of the left- and right-eye stages. The left-eye stage includes: a left-eye motor unit including a plurality of motors and adjusting the position and the image-capturing direction of the left-eye camera; a left-eye encoder unit including a plurality of encoders installed in the respective motors of the left-eye motor unit, each encoder sensing rotation of the corresponding motor, converting a sensed signal into an encoder signal, and creating an encoder signal containing information about a number of rotations of the corresponding motor; a left-eye signal generator receiving encoder signals generated from the encoders of the left-eye encoder unit and creating and outputting a phase change pulse signal whenever a phase change of a rising edge or a falling edge of each of the encoder signals occurs; and a left-eye signal counter counting a number of phase change pulse signals of each encoder generated from the left-eye signal generator and using a resultant count value to recognize a degree by which the corresponding motor is rotated.

In a preferred embodiment of this invention, the left-eye stage further comprises a pulse width variation unit varying a pulse width of the phase change pulse signal.

In a preferred embodiment of this invention, the system further comprising a phase-change-pulse-signal inversion unit provided for inverting a high signal and a low signal of the phase change pulse signal.

In a preferred embodiment of this invention, the pulse width variation unit adjusts the pulse width of the phase change pulse signal such that the pulse width ranges from 2 μs to 10 μs.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
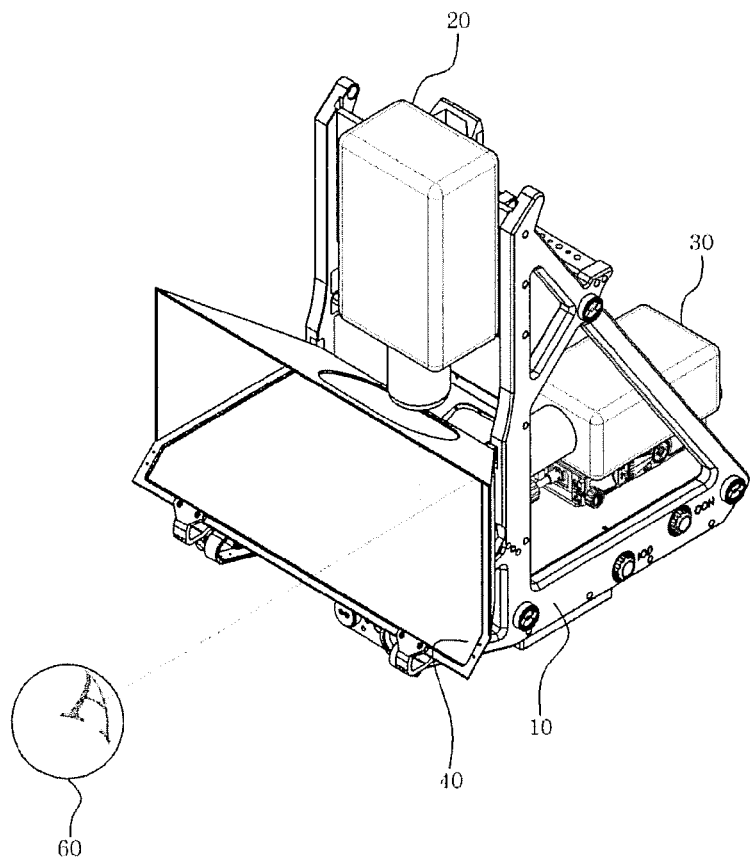
FIG. 1 is a view showing the configuration of a conventional system for controlling a camera rig.
Figure 2:
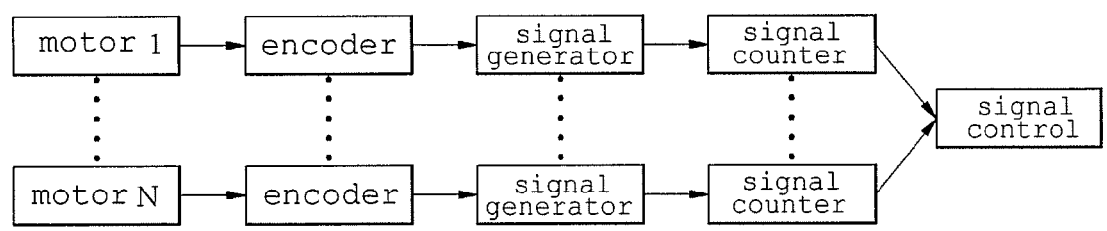
FIG. 2 is a block diagram showing the configuration of a conventional camera control apparatus using a motor.

Hereinafter, exemplary embodiments of the present invention will be described in detail with reference to the attached drawings. However, the present invention is not limited to the exemplary embodiments. The same reference numerals are used throughout the different drawings to designate the same or similar components.

To embody a stereographic image, there is the need for a left-eye image and a right-eye image, which are separately captured. Capturing the separate left- and right-eye images requires the use of a stereographic image capturing system that includes a left-eye camera for capturing the left-eye image and a right-eye camera for capturing the right-eye image.

As such, two cameras including the left-eye camera and the right-eye camera are required to capture a stereographic image. A user must be able to easily move and control the two cameras. Particularly, the user must also control the position and orientation of each of the left- and right-eye cameras and the relative positions and orientations of the left- and right-eye cameras.

For this, there is the need for a rig on which the two cameras can be installed. In addition, the two cameras installed on the rig must be able to move on the rig without restriction during an image capturing process.

Exemplary embodiments of the present invention introduce a system for controlling a camera rig for capturing a stereographic image that can achieve the above-mentioned purposes.

First Embodiment

Figure 3:
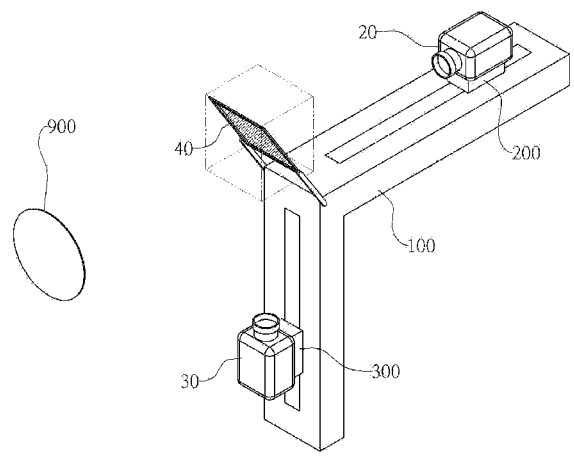
FIG. 3 is a perspective view illustrating a stereographic camera rig provided with a system for controlling a camera rig for capturing a stereographic image according to an embodiment of the present invention.
Figure 3:
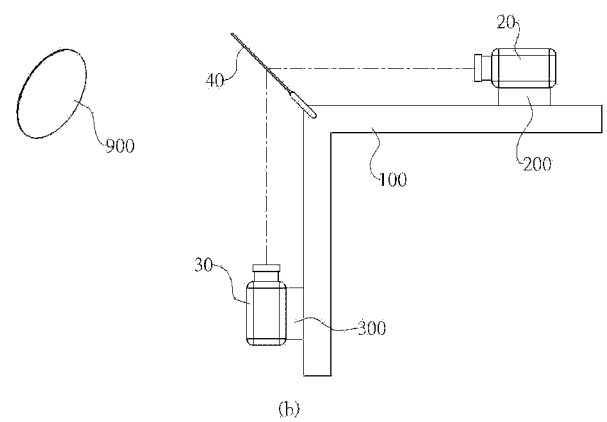
Figure 4:
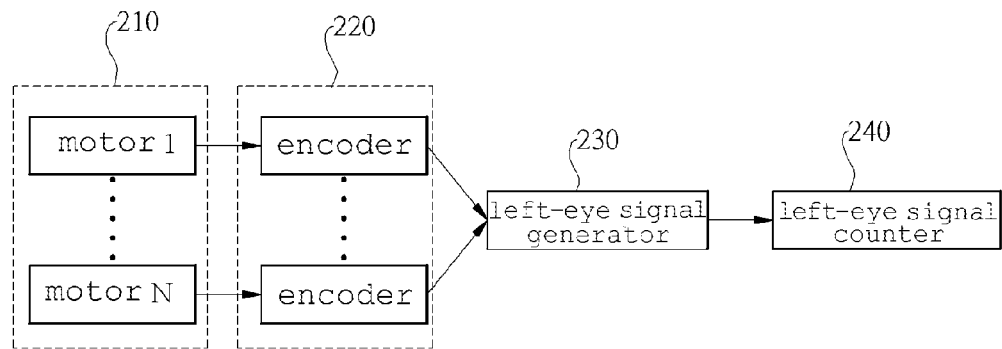
FIG. 4 is a view illustrating the configuration of the camera rig control system according to the embodiment of the present invention.
Figure 5:
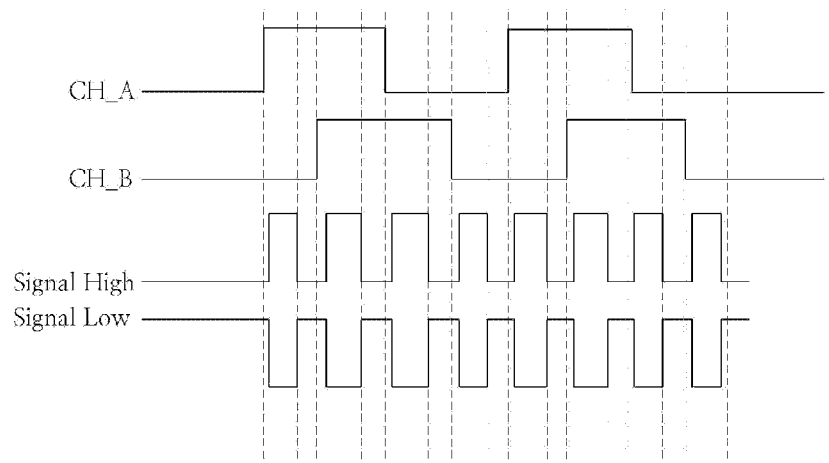
FIG. 5 is a view showing examples of signals generated from an encoder and a left-eye signal generator of FIG. 4.

FIG. 3 is a perspective view illustrating a stereographic camera rig provided with a system for controlling a camera rig for capturing a stereographic image according to a first embodiment of the present invention. FIG. 4 is a view illustrating the configuration of the camera rig control system according to the first embodiment of the present invention. FIG. 5 is a view showing examples of signals generated from an encoder and a left-eye signal generator of FIG. 4.

Referring to the drawings, the camera rig control system according to the first embodiment of the present invention includes a camera rig body 100, a left-eye stage 200, a right-eye stage 300 and a motor control device.

The left-eye stage 200 and the right-eye stage 300 are mounted to the camera rig body 100. Furthermore, a half mirror is installed on the camera rig body 100 so that images entering a left-eye camera 20 and a right-eye camera 30 are transmitted through or reflected by the half mirror.

The left-eye stage 200 is a device by which the left-eye camera 20 can be mounted to the camera rig body 100. Consequently, the position and orientation of the left-eye camera 20 can be adjusted by adjusting the position and orientation of the left-eye stage 200 on which the left-eye camera 20 is installed.

The right-eye stage 300 has the same configuration and function as those of the left-eye stage 200.

The motor control device creates control signals corresponding to variation in the positions and image-capturing directions of the left- and right-eye cameras 20 and 30, and transmits the control signals to the left- and right-eye stages 200 and 300. In addition, the motor control device receives from the left- and right-eye stages 200 and 300 signals corresponding to variation in the positions and image-capturing directions of the left- and right-eye cameras 20 and 30, and creates information about the positions and image-capturing directions of the left- and right-eye cameras 20 and 30.

In order to create a stereographic image requires the control of an interocular distance (IOD), which is the relative distance between the two cameras, that is, the left-eye camera 20 and the right-eye camera 30, the convergence pertaining to adjusting the focal distance of each of the two cameras, and the focal distances of lenses. The reason for this is because the three-dimensional effect of the created stereographic image depends on the above values. Moreover, the positions and image-capturing directions of the left- and right-eye cameras 20 and 30 are determined by the values of the two cameras that pertain to creating the stereographic image.

When specific values for the position and image-capturing direction of each camera are present, the motor control device transmits controls signals corresponding to the specific values to the left- and right-eye stages 200 and 300.

The motor control device uses motors installed in the left-eye stage 200 and the right-eye stage 300 and thus adjusts the positions and the orientations of the left- and the right-eye stages 200 and 300 such that the positions and the image-capturing directions of the left- and right-eye cameras 20 and 30 correspond to control signals transmitted from the motor control device.

Furthermore, the motor control device receives, from the motors installed in the left- and right-eye stages 200 and 300, information about rotation of the motors.

The left-eye camera 20 and the right-eye camera 30 are respectively coupled to the left-eye stage 200 and the right-eye stage 300, and are thus synchronized with the operation of the left-eye stage 200 and the right-eye stage 300.

Therefore, through information about the rotation of the motors installed in the left- and right-eye stages 200 and 300, information about the positions and orientations of the left- and right-eye cameras 20 and 30, which are respectively coupled to the left- and right-eye stages 200 and 300, can be known.

The left-eye stage 200 includes a left-eye motor unit 210, a left-eye encoder unit 220, a left-eye signal generator 230, and a left-eye signal counter 240. Furthermore, although it is not shown in the drawings, the left-eye stage 200 includes a left-eye frame, which includes a left-eye stage casing and mechanical elements which are installed in the casing to couple the corresponding camera to the left-eye stage 200.

The left-eye motor unit 210 comprises a plurality of motors. The position and the image-capturing direction of the left-eye camera 20 are controlled by rotation of the motors.

The left-eye encoder unit 220 comprises a plurality of encoders which are installed in the respective motors. Each encoder creates an encoder signal corresponding to the rotation of the associated motor.

The left-eye signal generator 230 receives encoder signals generated from the encoders of the left-eye encoder unit 220 and creates a phase change pulse signal whenever the phase of each encoder signal is changed, in other words, when a rising edge or a falling edge occurs.

The left-eye signal counter 240 counts the number of phase change pulse signals of each encoder that are generated from the left-eye signal generator 230. This count value of the left-eye signal counter 240 is used to recognize the degree by which the associated motor is rotated.

The left-eye signal generator 230 further includes a pulse width variation unit, which varies the pulse widths of the phase change pulse signals. The pulse width variation unit increases or reduces the pulse widths of the phase change pulse signals generated from the left-eye signal generator 230, thus preventing an error from being caused when the left-eye signal counter 240 counts the number of phase change pulse signals.

For example, when the pulse width of a phase change pulse signal is comparatively small, the left-eye signal counter 240 may not be able to sense the phase change pulse signal. In this case, the pulse width variation unit increases the pulse width of the phase change pulse signal to an appropriate degree, thus avoiding the problem whereby the left-eye signal counter 240 may not be able to sense the phase change pulse signal.

In the camera rig control system according to the first embodiment of the present invention, the pulse width variation unit controls the phase change pulse width such that it ranges from 2 μs to 10 μs, thereby preventing the problem whereby the phase change pulse signal may not be sensed.

The left-eye signal generator 230 further includes a phase-change-pulse-signal inversion unit, which inverts a high signal and a low signal of the phase change pulse signal.

In detail, a circuit of the left-eye signal counter 240 may be configured such that the detection rate of the high signal of the pulse signal is higher than that of the low signal. Alternatively, it may be configured such that the detection rate of the low signal of the pulse signal is higher than that of the high signal.

Given this, the phase-change-pulse-signal inversion unit inverts the high signal and the low signal of the phase change pulse signal depending on the kind of circuit of the left-eye signal counter 240.

FIG. 5 shows a high signal and a low signal, which is formed by inverting the high signal using the phase-change-pulse-signal inversion unit.

As described above, a system for controlling a camera rig according to the present invention is configured such that a single signal generator and a single signal counter can process signals generated from motors and encoders, rather than having a structure such that each motor has a separate signal generator and signal counter for processing encoder signals. Therefore, the camera rig control system can have a simple structure, whereby the production cost thereof can be reduced.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for controlling a camera rig for capturing a stereographic image, comprising:
    a camera rig body on which a left-eye camera for capturing a left-eye image and a right-eye camera for capturing a right-eye image are installed;
    a left-eye stage connecting the left-eye camera to the camera rig body, the left-eye stage being configured to adjust a position and an image-capturing direction of the left-eye camera;
    a right-eye stage connecting the right-eye camera to the camera rig body, the right-eye stage being configured to adjust a position and an image-capturing direction of the right-eye camera; and
    a motor control device creating control signals corresponding to variation in the positions and the image-capturing directions of the left- and right-eye cameras and transmitting the control signals to the left- and right-eye stages to control movement of the left- and right-eye stages,
    wherein the left-eye stage comprises:
    a left-eye motor unit including a plurality of motors and adjusting the position and the image-capturing direction of the left-eye camera;
    a left-eye encoder unit including a plurality of encoders installed in the respective motors of the left-eye motor unit, each encoder sensing rotation of the corresponding motor, converting a sensed signal into an encoder signal, and creating an encoder signal containing information about a number of rotations of the corresponding motor;
    a left-eye signal generator receiving encoder signals generated from the encoders of the left-eye encoder unit and creating and outputting a phase change pulse signal whenever a phase change of a rising edge or a falling edge of each of the encoder signals occurs;
    a left-eye signal counter counting a number of phase change pulse signals of each encoder generated from the left-eye signal generator and using a resultant count value to recognize a degree by which the corresponding motor is rotated; and
    a pulse width variation unit varying a pulse width of the phase change pulse signal.

2. The system as set forth in claim 1, further comprising:
    a phase-change-pulse-signal inversion unit provided for inverting a high signal and a low signal of the phase change pulse signal.

3. The system as set forth in claim 1, wherein the pulse width variation unit adjusts the pulse width of the phase change pulse signal such that the pulse width ranges from 2 μs to 10 μs.

4. A system for controlling a camera rig for capturing a stereographic image, comprising:
    a camera rig body on which a left-eye camera for capturing a left-eye image and a right-eye camera for capturing a right-eye image are installed;
    a left-eye stage connecting the left-eye camera to the camera rig body, the left-eye stage being configured to adjust a position and an image-capturing direction of the left-eye camera;
    a right-eye stage connecting the right-eye camera to the camera rig body, the right-eye stage being configured to adjust a position and an image-capturing direction of the right-eye camera; and
    a motor control device creating control signals corresponding to variation in the positions and the image-capturing directions of the left- and right-eye cameras and transmitting the control signals to the left- and right-eye stages to control movement of the left- and right-eye stages,
    wherein the left-eye stage comprises:
    a left-eye motor unit including a plurality of motors and adjusting the position and the image-capturing direction of the left-eye camera;
    a left-eye encoder unit including a plurality of encoders installed in the respective motors of the left-eye motor unit, each encoder sensing rotation of the corresponding motor, converting a sensed signal into an encoder signal, and creating an encoder signal containing information about a number of rotations of the corresponding motor;

a left-eye signal generator receiving encoder signals generated from the encoders of the left-eye encoder unit and creating and outputting a phase change pulse signal whenever a phase change of a rising edge or a falling edge of each of the encoder signals occurs;

a left-eye signal counter counting a number of phase change pulse signals of each encoder generated from the left-eye signal generator and using a resultant count value to recognize a degree by which the corresponding motor is rotated; and a pulse width variation unit varying a pulse width of the phase change pulse signal, which adjusts the pulse width of the phase change pulse signal such that the pulse width ranges from 2 μs to 10 μs.

* * * * *